(12) United States Patent
Huang

(10) Patent No.: US 7,433,569 B2
(45) Date of Patent: Oct. 7, 2008

(54) PULLING STRUCTURE FOR AN OPTICAL TRANSCEIVING MODULE

(75) Inventor: Lung-Hua Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 574 days.

(21) Appl. No.: 11/073,696

(22) Filed: Mar. 8, 2005

(65) Prior Publication Data

US 2005/0201074 A1 Sep. 15, 2005

(30) Foreign Application Priority Data

Mar. 10, 2004 (TW) ............................... 93106390 A

(51) Int. Cl.
- *G02B 6/00* (2006.01)
- *H04B 10/00* (2006.01)
- *H05K 7/14* (2006.01)
- *H05K 7/18* (2006.01)

(52) U.S. Cl. ..................... 385/134; 385/88; 385/89; 385/92; 385/136; 398/135; 361/801

(58) Field of Classification Search ............... 385/53, 385/55, 56, 70, 76, 77, 78, 88, 89, 92, 94, 385/134, 136, 137, 139, 100; 398/135, 139; 361/801

See application file for complete search history.

(56) References Cited

U.S. PATENT DOCUMENTS

| 6,519,160 | B1 * | 2/2003 | Branch et al. ............... 361/754 |
| 6,832,856 | B2 * | 12/2004 | Chiu et al. .................... 385/53 |
| 2003/0194190 | A1 * | 10/2003 | Huang .......................... 385/92 |
| 2003/0198025 | A1 * | 10/2003 | Cao ............................ 361/728 |
| 2005/0201074 | A1 * | 9/2005 | Huang ......................... 361/801 |

* cited by examiner

*Primary Examiner*—Brian M Healy
(74) *Attorney, Agent, or Firm*—Muncy, Geissler, Olds & Lowe, PLLC

(57) ABSTRACT

A pulling structure for an optical transceiving module is disclosed. The pulling structure includes a latch base, a latch, a linking member, and a pulling rod. The latch base is mounted on the optical transceiving module. The latch is mounted in the latch base. The linking member is coupled to the latch to enable the latch to move along a particular direction. The pulling rod is pivotably driving the linking member.

25 Claims, 16 Drawing Sheets

PULLING STRUCTURE FOR AN OPTICAL TRANSCEIVING MODULE

RELATED APPLICATIONS

The present application is based on, and claims priority from, Taiwan Application Serial Number 93106390, filed Mar. 10, 2004, the disclosure of which is hereby incorporated by reference herein in its entirety.

BACKGROUND OF INVENTION a) Field of the Invention

The present invention relates to an optical transceiving module and, more particularly, to a pulling structure for optical transceiving modules.

b) Description of the Related Art

Communication set such as hubs often has an optical transceiving module for transforming optical signals to electrical signals. The optical transceiving module is composed of a photoelectric transducer and a case and is usually hot-plugged into the communication set for the purpose of easy inspection.

As illustrated in FIG. 4A, a conventional optical transceiving module 4 consists of a module body 41 and a photoelectric transducer 42 mounted therein. Moreover, a bump 411 and a slider 412 are mounted on the front of the bottom of the module body 41. As illustrated in FIG. 4B, when the optical transceiving module 4 is coupled to a communication set 7, the bump 411 on the bottom of the module body 41 is joined to a fastening hole 711 of a fastener 71 mounted on the bottom of the communication set 7. In order to pull out the optical transceiving module 4 from the communication set 7, user must push the slider 412 towards the fastener 71 to lift the fastener 71 and therefore to release the bump 411 from the fastening hole 711 of the fastener 71.

However, the disclosed slider 412 does not automatically return to its' position on the optical transceiving module 4 after the optical transceiving module 4 is released from the communication set 7. As a result, when the optical transceiving module 4 is again coupled to the communication set 7, the joint between the bump 411 and the fastening hole 711 becomes very inconvenient.

Moreover, since the slider 412 mounted on the front of the bottom of the module body 41 does not extend outside of the frontal edge of the module body 41, it is hard for the user to pull out the optical transceiving module 4 from a communication set 7 that is arranged vertically as illustrated in FIG. 4C.

BRIEF SUMMARY OF THE INVENTION

In view of the foregoing problems, an object of the invention is to provide an optical transceiving module with a pulling structure that is convenient to operate.

Another object of the invention is to provide an optical transceiving module with a pulling structure that is easy to operate when communication set are in a vertically side-by-side arrangement.

The pulling structure of the invention includes a latch base, a latch, a linking member, and a pulling rod. The latch base is mounted on the optical transceiving module. The latch is mounted in the latch base. The linking member is coupled to the latch to enable the latch to move along a particular direction. The pulling rod is pivotably driving the linking member.

In one embodiment, the linking member is a cross bar which turns together with the pulling rod so that an active plate of the pulling rod pushes the latch to move horizontally.

In another embodiment, the pulling rod turns about the particular pivot on the latch base and makes the linking member, which is a cross bar, and the latch to move horizontally.

Yet another embodiment, the turning of the pulling rod forces the linking member and the latch to move vertically.

The latch of the pulling structure according to the invention is capable of returning to its' initial position, which solves the preexisted problem in the conventional technology.

DETAILED DESCRIPTION OF THE INVENTION

The invention has a disengagement design based on the moment equilibrium principles. The disengagement of a bump on an optical transceiving module and a fastening hole of a communication set is realized by the action of a turnable pulling rod and a latch.

Figure 1A:
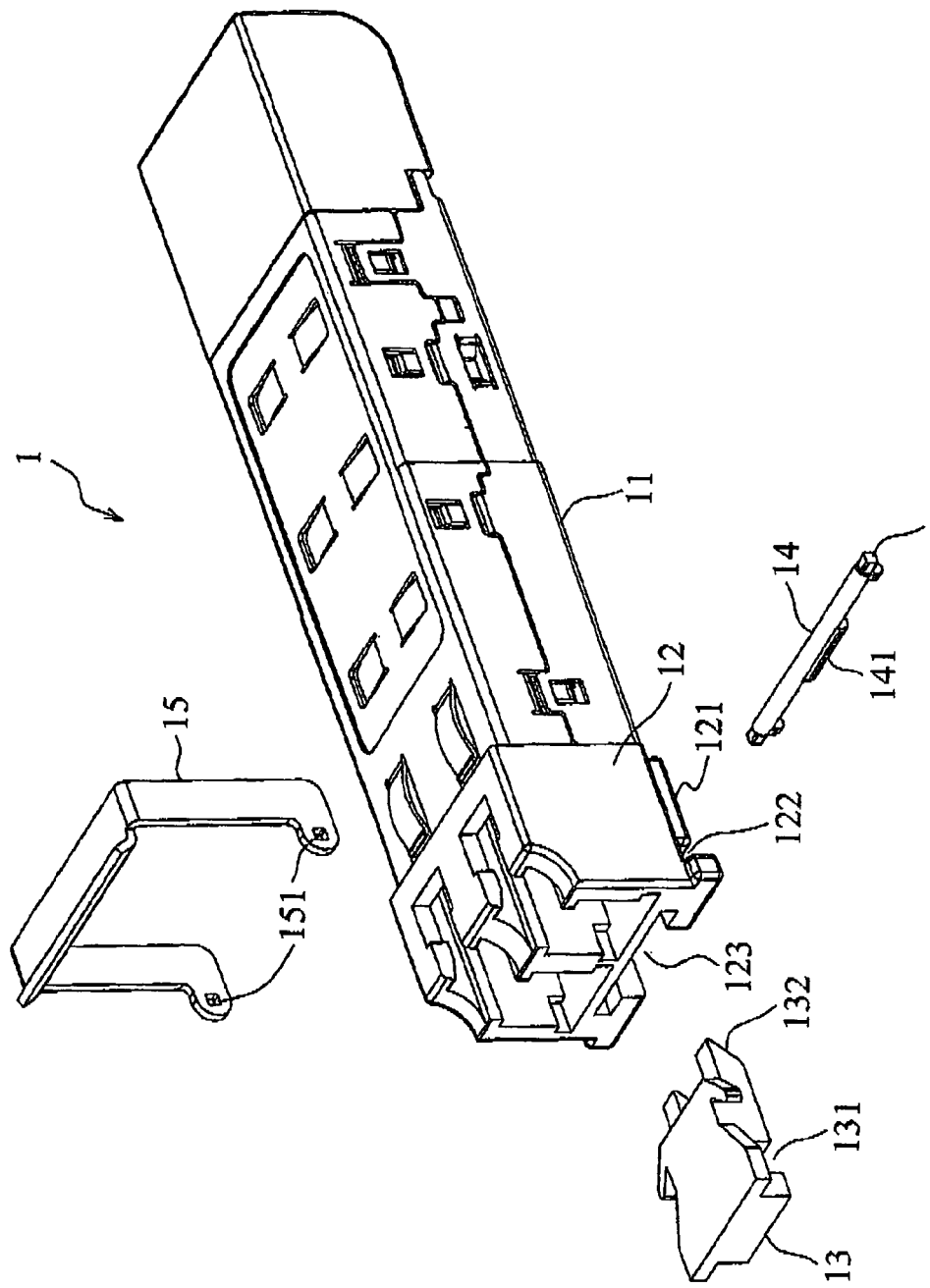
FIG. 1A is a perspective illustration showing the elements of a pulling structure for an optical transceiving module according to the first embodiment of the invention.
Figure 1B:
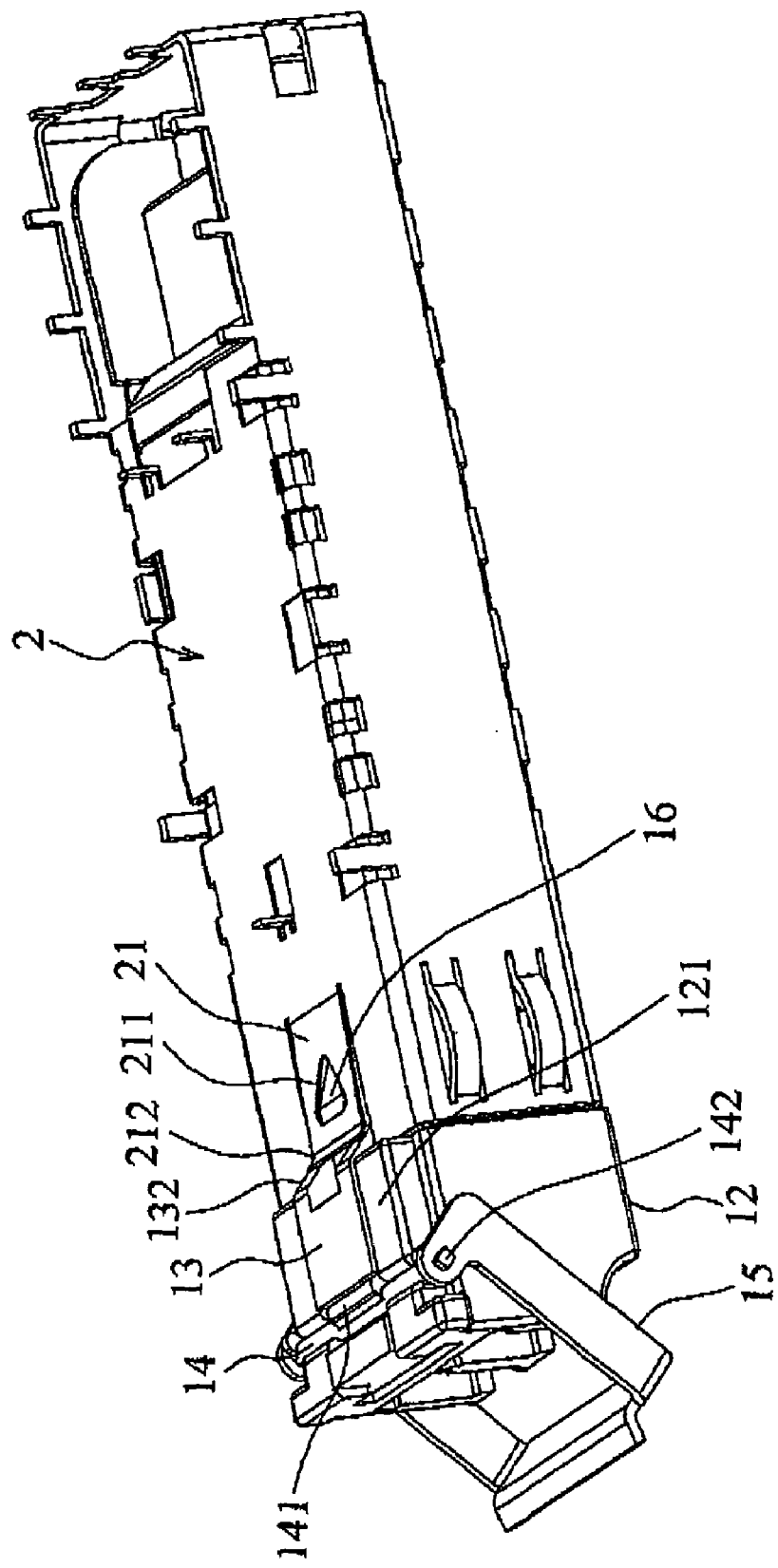
FIG. 1B~FIG. 1C is a perspective view of a pulling structure in operation according to the first embodiment of the invention.

Referring to FIGS. 1A & 1B, an optical transceiving module 1 according to a first embodiment of the invention has a module body 11, a latch base 12, a latch 13, a cross bar 14, a pulling rod 15, and a fixed bump 16 formed on the module body 11 or the latch base 12. The latch base 12, the latch 13, the cross bar 14 and the pulling rod 15 make up the pulling structure of the optical transceiving module 1, and the cross bar 14 can be seen as the linking member of the latch 13.

The latch base 12 is mounted on one end of the optical transceiving module 1 that is close to the fixed bump 16, and two supports 121 are placed in parallel on the latch base 12. The two supports 121 each has a recess 122 and the two recesses 122 are aligned with each other. The latch 13 has a groove 131 on its' surface and a slanted terminal face 132. The cross bar 14 has an active plate 141 extending from the center and two end portions 142 for connecting with through holes 151 formed on two sides of the pulling rod 15. The fixed bump 16 is for connecting with a fastening hole 211 of a fixed cover 21 on the communication set (or housing) 2.

The first step in assembling the latch 13, cross bar 14, and pulling rod 15 on the latch base 12 is to place the latch 13 in a space 123 gapped by the two supports 121 on the latch base 12, and to align the groove 131 of the latch 13 with the recesses 122 of the supports 121. The second step is to insert the cross bar 14 into the recesses 122 and the groove 131, and have the active plate 141 located inside the groove 131. Then, the two through holes 151 of the pulling rod 15 and the two end portions 142 of the cross bar 14 are jointed, respectively.

Figure 1C:
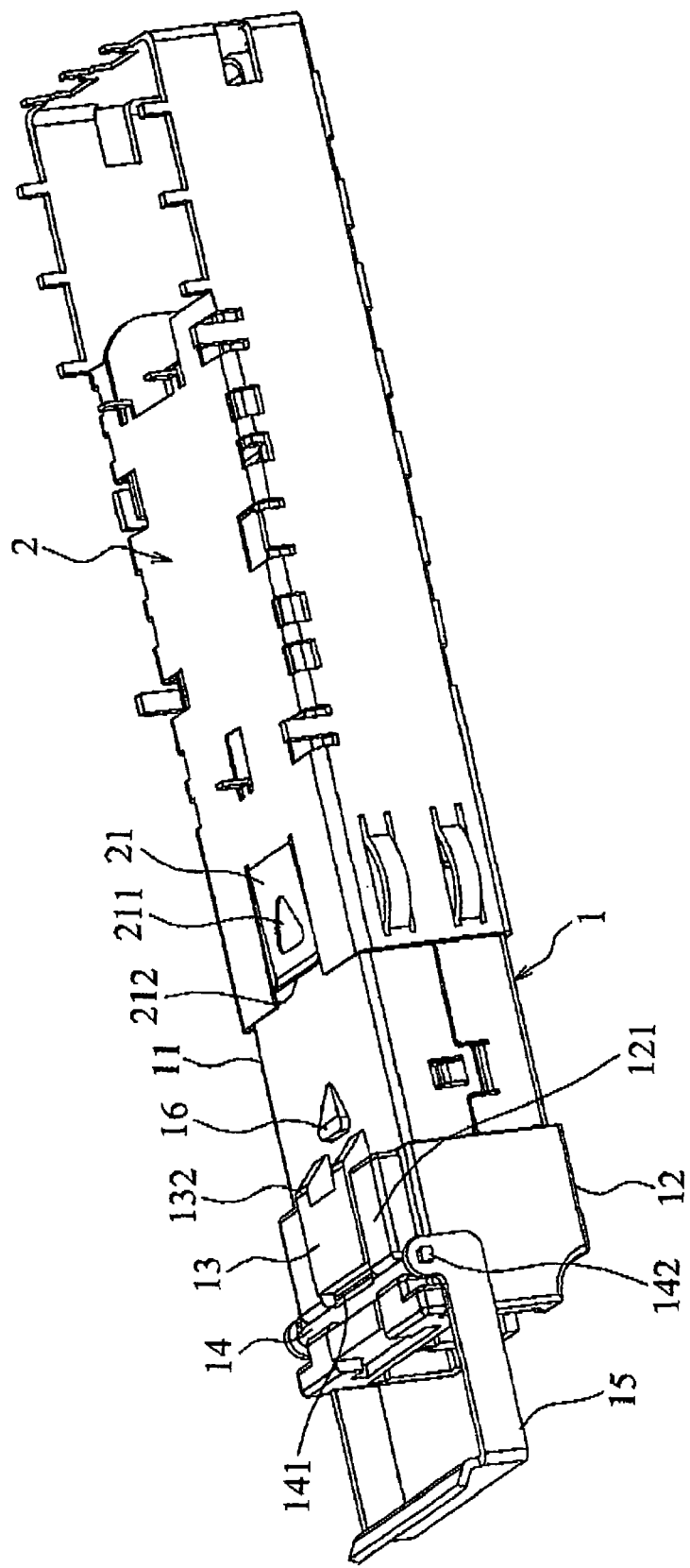

Referring to FIG. 1B and FIG. 1C, the pulling rod 15 pivots on the end portions 142 and drives the cross bar 14 in this embodiment. When the pulling rod 15 is turned to a particular angle, the active plate 141 comes in contact with the groove 131. Then, the torque applied on the pulling rod 15 converts into a force applied on the groove 131 to push the latch 13 towards the fixed bump 16 horizontally. The terminal face 132 of the latch 13 moves along a terminal face 212 of the fixed cover 21 to push up the fixed cover 21, and therefore release the fixed bump 16 from the fastening hole 211. As the turning of the pulling rod 15 continues, the fixed bump 16 can be completely disengaged from the fastening hole 211.

In this embodiment, the cross bar 14 has a shape such as polygon, circle, ellipse, triangle or rectangle. The active plate 141 of the cross bar 14 has a curved surface or a plane. Moreover, it is preferred that the latch 13 has a large surface area and slim thickness for that the latch 13 can fit in the space 123 and slide on the latch base 12. The terminal face 212 of the fixed cover 21 is slanted and faces the fixed bump 16.

Since the pulling rod 15 leads the movement of the latch 13, the pulling rod 15 can be used to return the latch 13 back to its' position after the fixed bump 16 is disengaged from the fastening hole 211. Thus, when we put the optical transceiving module 1 back into the communication set 2 in the next time, the joint of the fixed bump 16 of the optical transceiving module 1 and the fastening hole 211 of the communication set 2 can be accomplished without any difficulty. In addition, the latch 13 and therefore the pulling rod 15 can return to their position due to the action of the fixed cover 21.

Figure 2A:
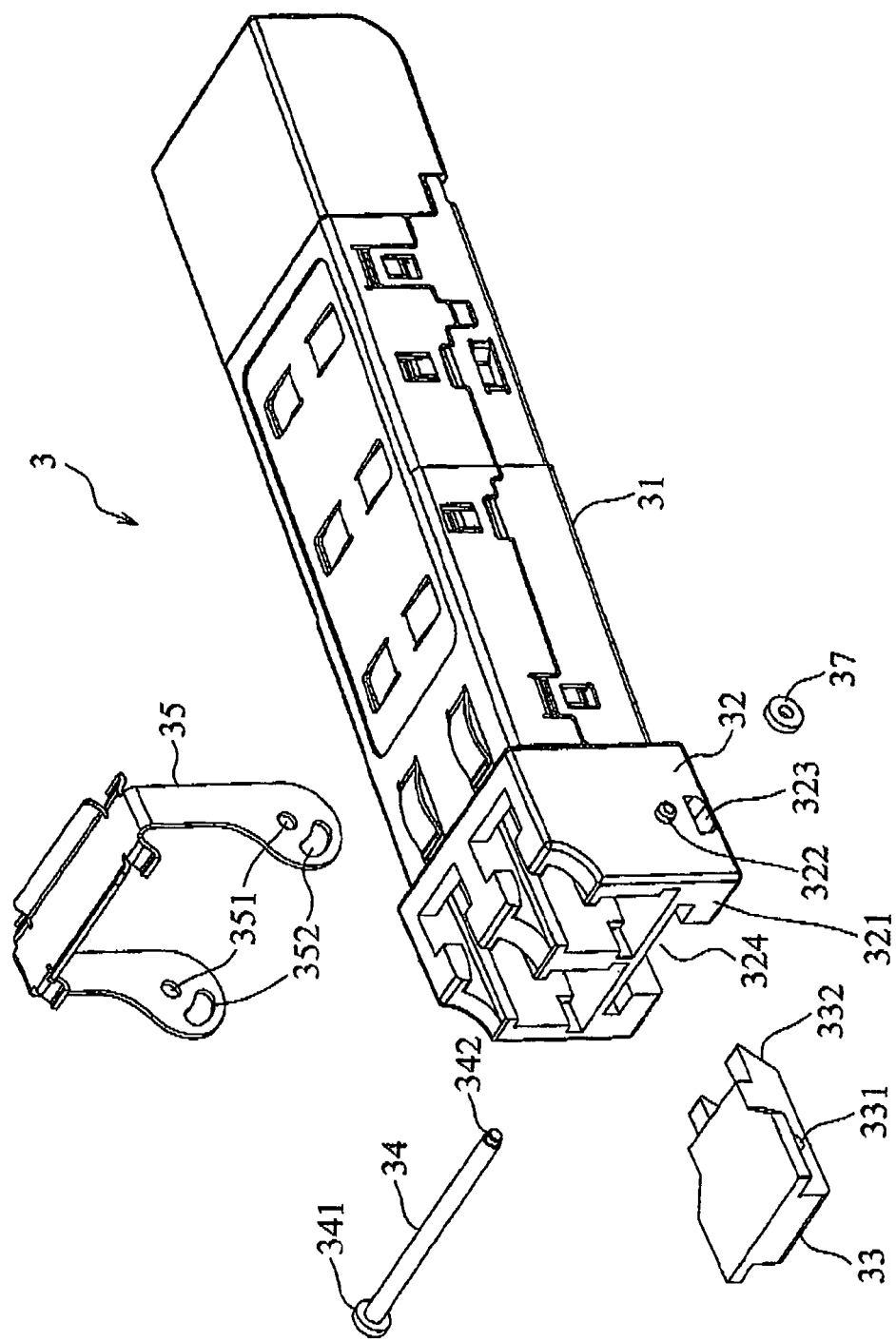
FIG. 2A is a perspective diagram illustrating the elements of a pulling structure for an optical transceiving module according to the second embodiment of the invention.
Figure 2B:
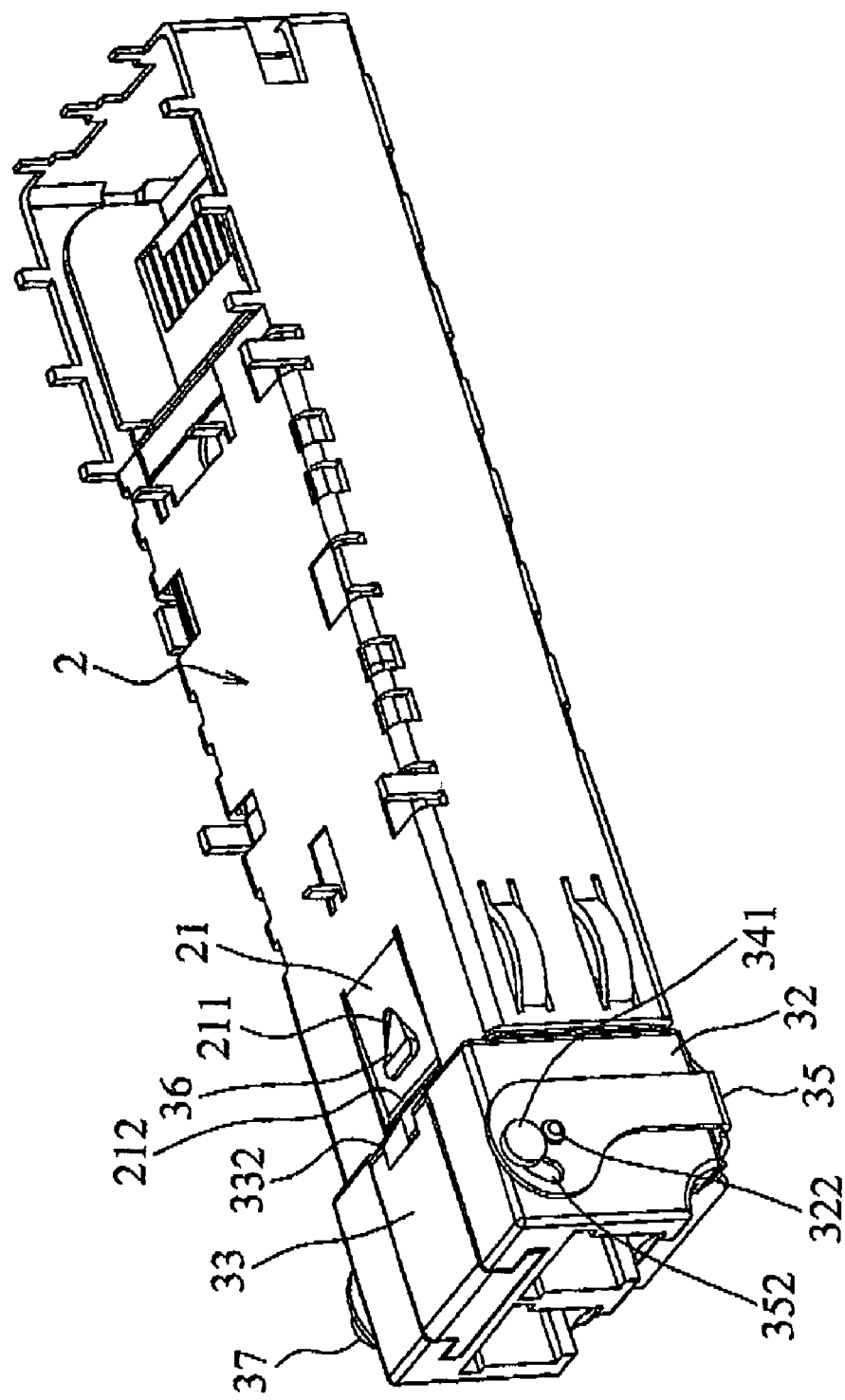
FIG. 2B~FIG. 2E is a perspective diagram illustrating a pulling structure in operation according to the second embodiment of the invention.

Referring to FIG. 2A and FIG. 2B, an optical transceiving module 3 according to the second embodiment of the invention includes a module body 31, a latch base 32, a latch 33, a cross bar 34, a pulling rod 35, a fixed bump 36, and a fastener 37. The latch base 32, the latch 33, the cross bar 34, the pulling rod 35, and the fastener 37 make up the pulling structure of the optical transceiving module 3. The cross bar 34 is employed as a linking member of the latch 33. The same reference numerals refer to the same parts through out the following descriptions.

The latch base 32 is mounted on one end of the optical transceiving module 3 that is close to the fixed bump 36, and two supports 321 are placed on two sides of the latch base 32 and parallel to each other. Each of the two supports 321 has a through hole 323 for allowing the cross bar 34 to penetrate on side and the through holes 323 are in alignment. The latch base 32 has pivot 322 formed on two sides for joining with through holes 351 of the pulling rod 35. The latch 33 has a slanted terminal face 332 and a through hole 331 penetrating two sides. The cross bar 34 has a head 341 at one end with radius larger than that of the cross bar 34 and a pivot joint 342 at the other end for joining with the fastener 37. The fixed bump 36 of the optical transceiving module 3 is for joining with the fastening hole 211 of the fixed cover 21 of the communication set 2. The pulling rod 35 further includes through holes 352 for the cross bar 34 to insert.

The process of assembling the latch 33, the cross bar 34, the pulling rod 35 and the fastener 37 on the latch base 32 is described below. The first step is to fasten the two through holes 351 on the sides of the pulling rod 35 with the two pivots 322, and align the two through holes 352 with the through holes 323. Secondly, place the latch 33 in a space 324 among the latch base 32 and the two supports 321, and align the through holes 331 with the through holes 323. Thirdly, insert the pivot joint 342 of the cross bar 34 into the through holes 352, through holes 323 and through holes 331. Then, join the pivot joint 342 of the cross bar 34 with the fastener 37.

Figure 2C:
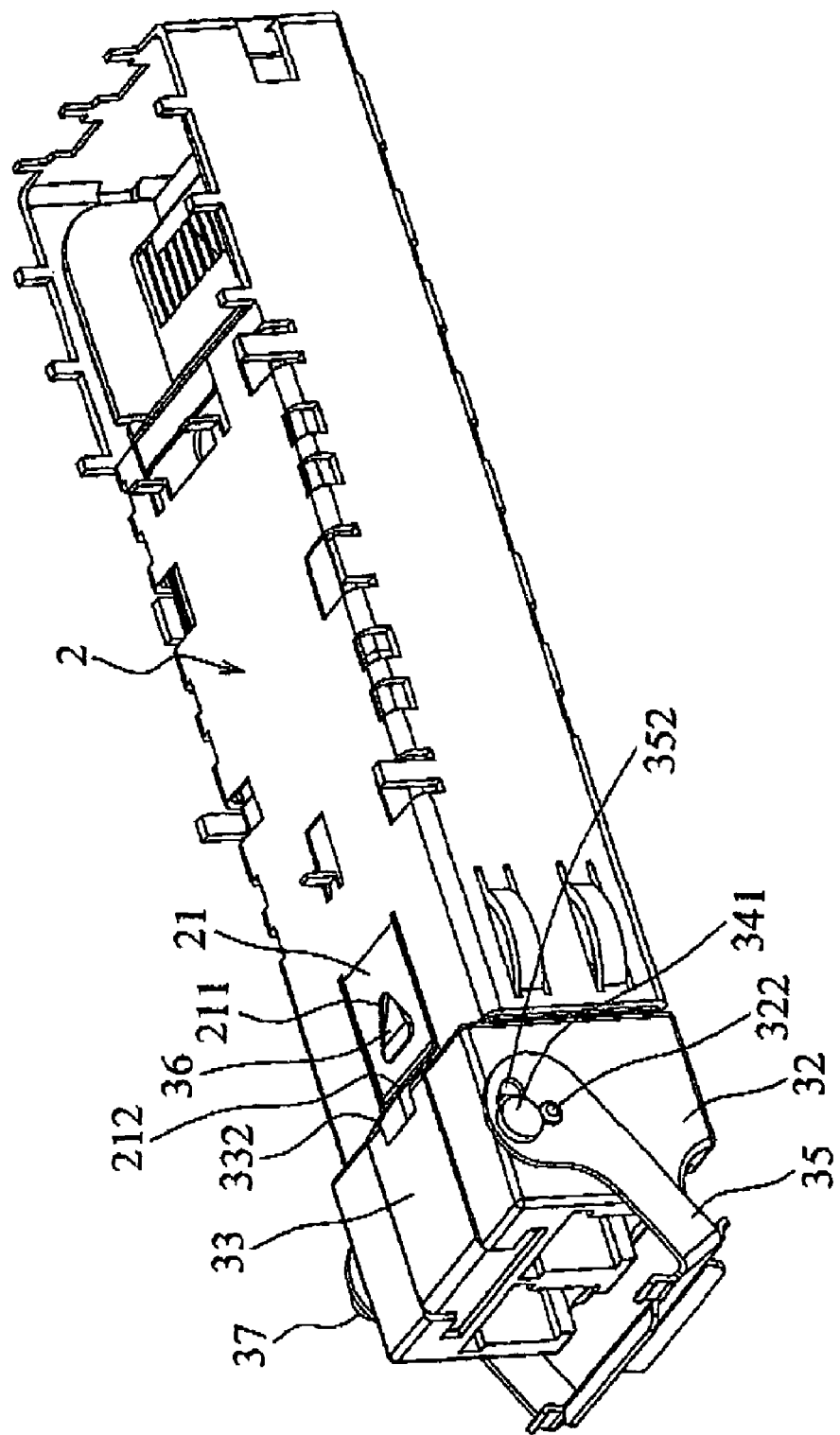
Figure 2D:
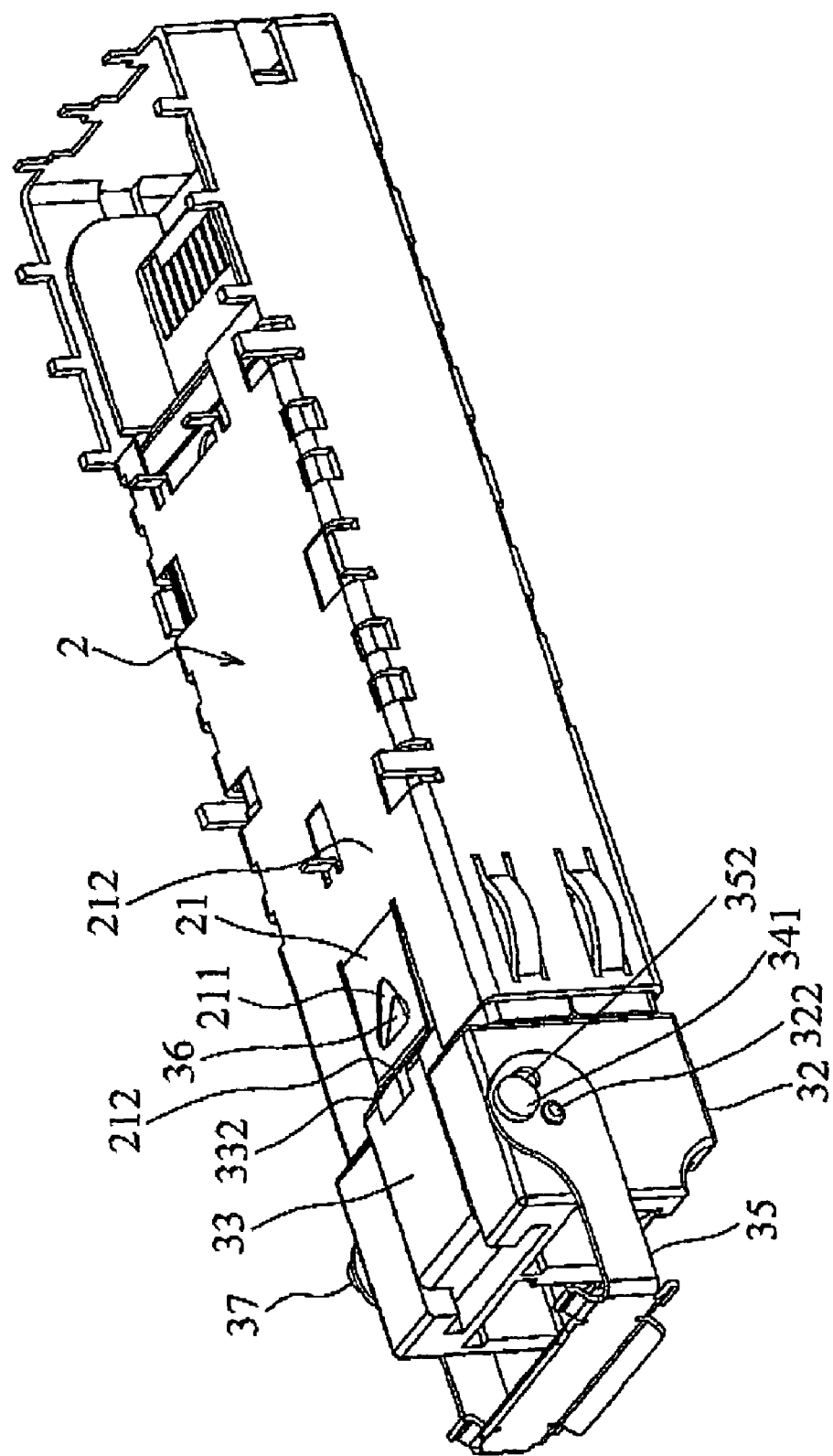
Figure 2E:
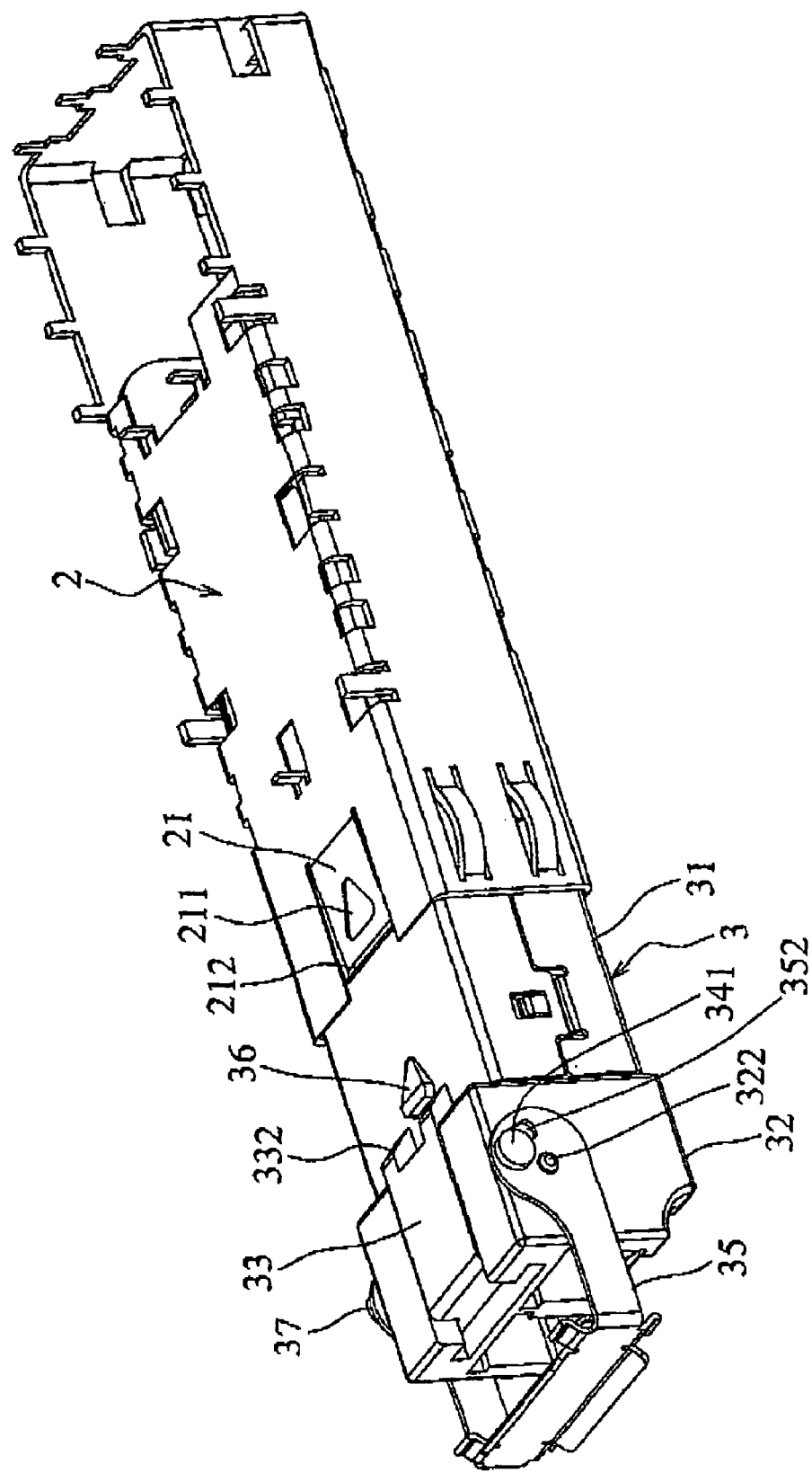

Referring to FIGS. 28 to 2E, the diameter of the through holes 352 of the pulling rod 35 is larger than that of the cross bar 34, so the pulling rod 35 rotates about the pivots 322 in this embodiment. While the pulling rod 35 is turning, the cross bar 34 stays motionless until it comes in contact with the other end of the through holes 352 as illustrated in FIG. 2C. When the pulling rod 15 continues to rotate, the cross bar 34 moves within the through holes 323 because the size of the through holes 323 in the supports 321 is larger than that of the cross bar 34. Through the movement, the torque applied on the pulling rod 35 is transformed into a force to push the latch 33 towards the fixed bump 16. Hence, the terminal face 332 of the latch 33 slides along the terminal face 212 of the fixed cover 21 and pushes the fixed cover 21 of the communication set 2 up to release the fixed bump 16 from the fastening hole 211. When the pulling rod 35 is turned to a particular angle, such as 90 degrees, the fixed bump 16 is fully disengaged from the fastening hole 211.

In this embodiment, the end face of the cross bar 34 has the same shape as the through holes 331, such as circular shape, and the cross bar 34 fits in the through holes 331. The latch 33 is preferred to have large surface area and slim thickness to make the latch 33 fit in the space 324 and slide smoothly along the latch base 32. The fastener 37 can be a nut for joining with the threaded pivot joint 342 and the terminal face 212 of the fixed cover 21 is slanted and faces the fixed bump 16.

Furthermore, since the pulling rod 35 is easily to be adjust and there is a linking relationship between the pulling rod 35 and the latch 33, the disassembling of the optical transceiving module 3 from the communication set 2 is easily accomplished.

Figure 3A:
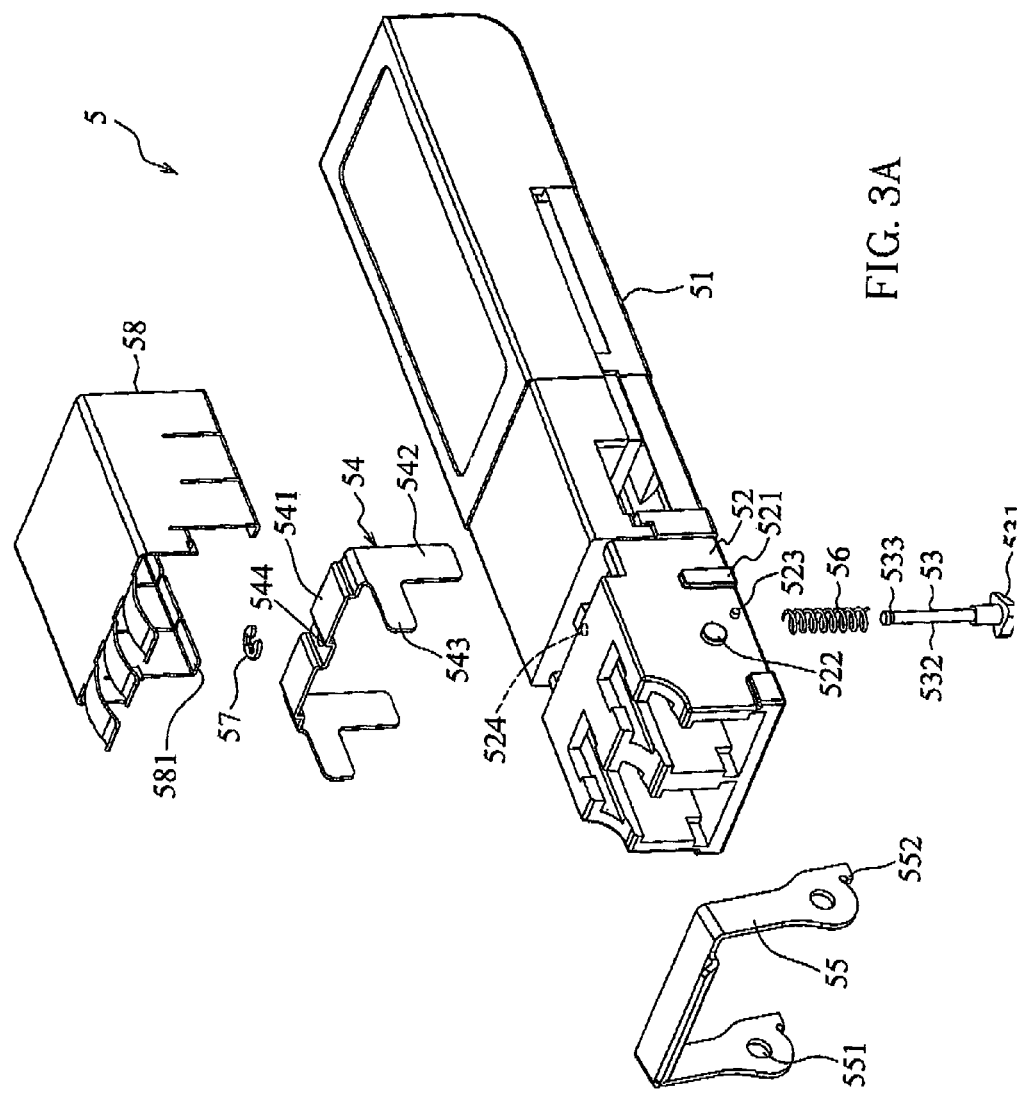
FIG. 3A is a perspective diagram illustrating the elements of a pulling structure for an optical transceiving module according to the third embodiment of the invention.
Figure 3B:
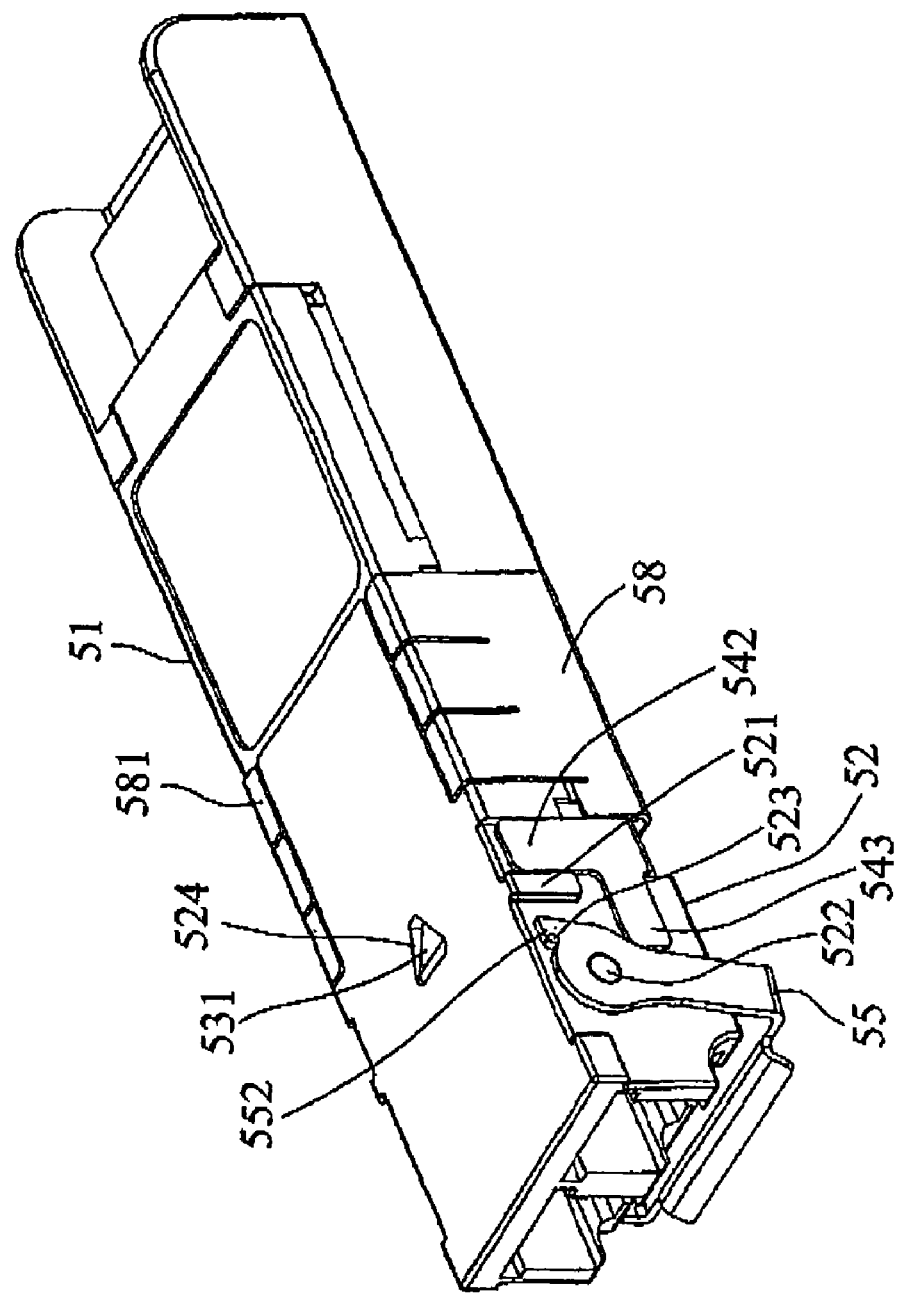
FIG. 3B~FIG. 3F is a perspective diagram illustrating a pulling structure in operation according to the third embodiment of the invention.
Figure 3C:
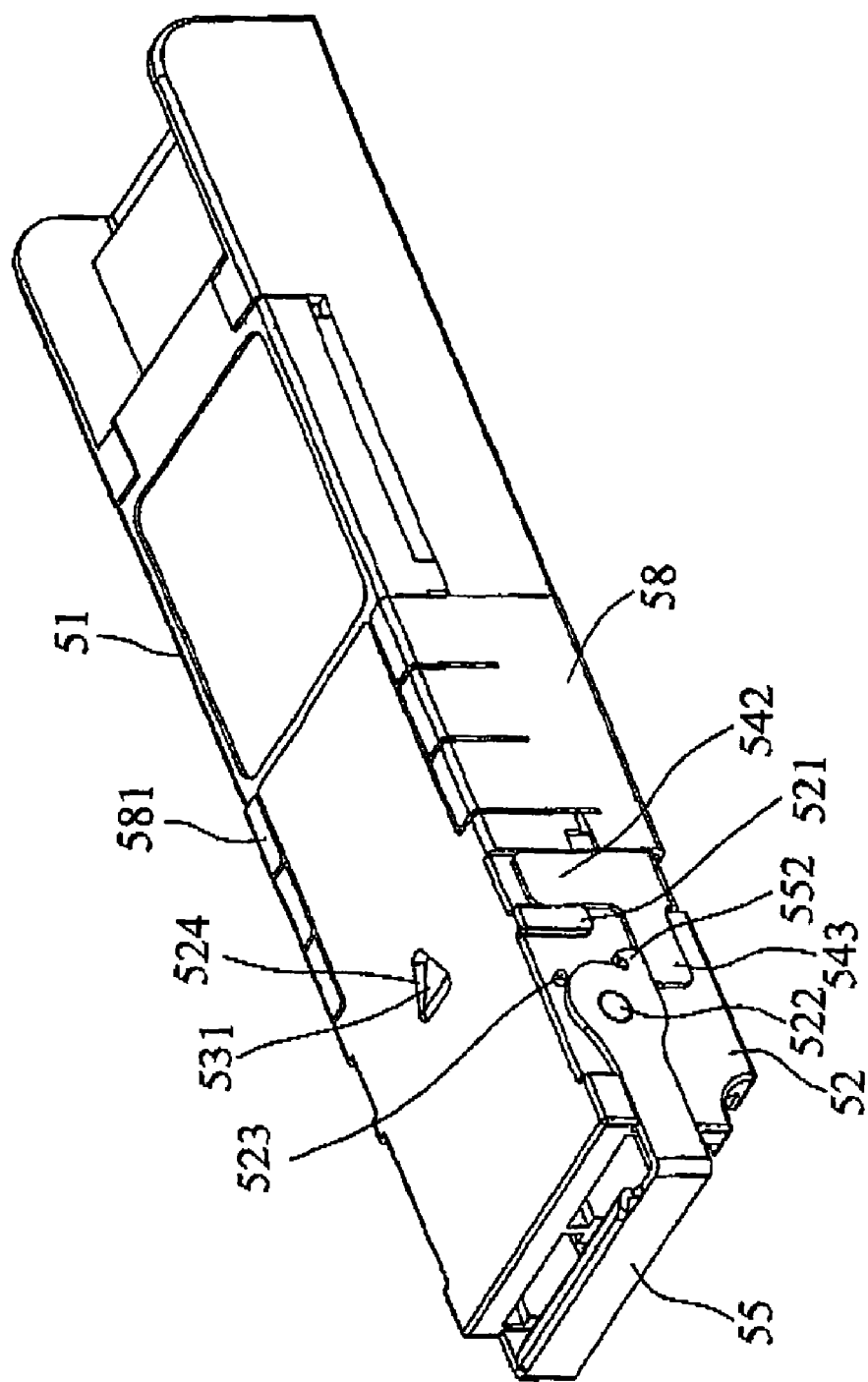

Referring to FIG. 3A and FIG. 3B, an optical transceiving module 5 according to the third embodiment of the invention includes a module body 51, a latch base 52, a latch 53, a linking member 54, a pulling rod 55, an elastomer 56 encirled the latch 53 such as springs, and a fastener 57. The latch base 52, the latch 53, the linking member 54, the pulling rod 55, the elastomer 56, and the fastener 57 make up the pulling structure of the optical transceiving module 5.

Figure 3D:
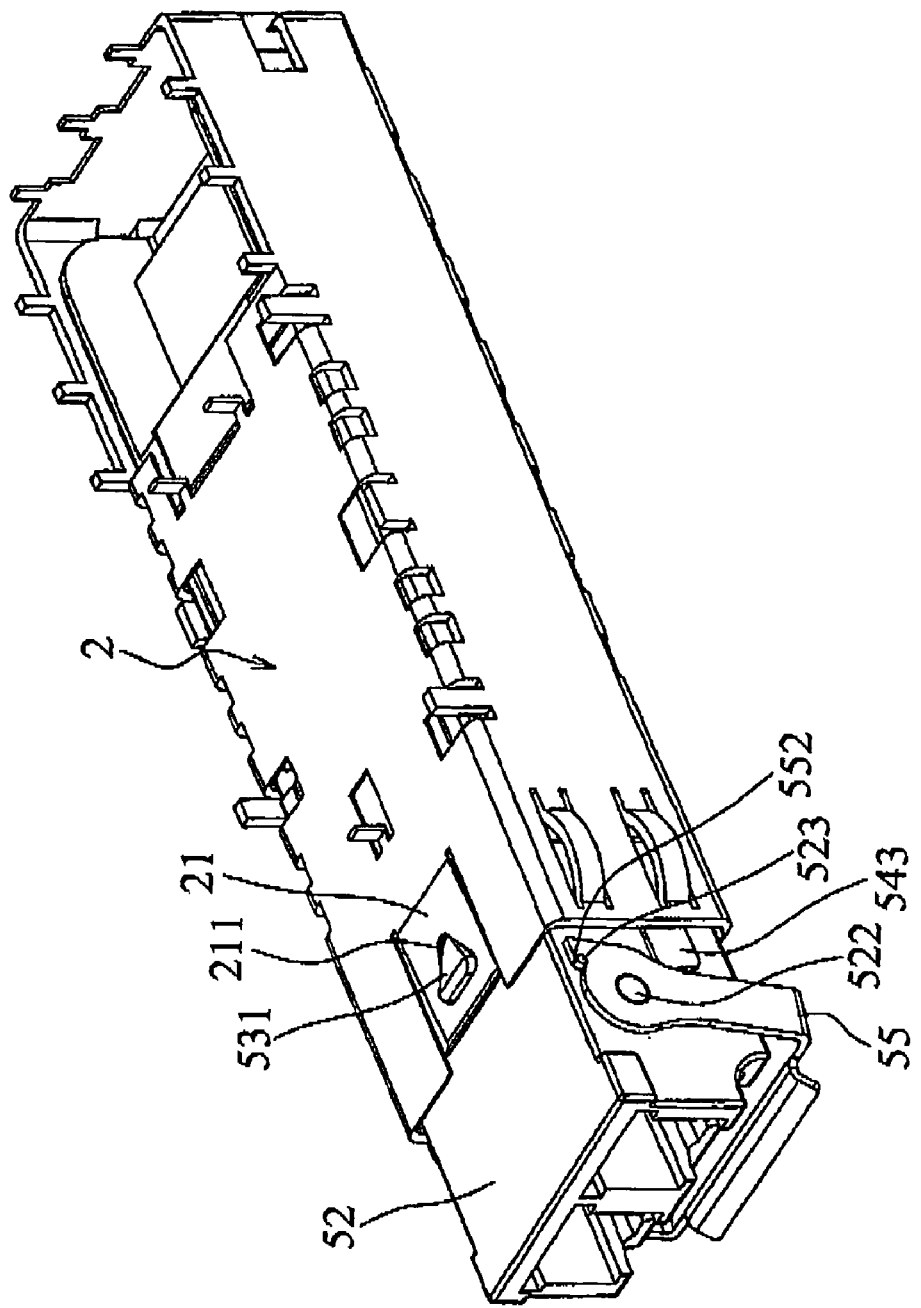
Figure 3E:
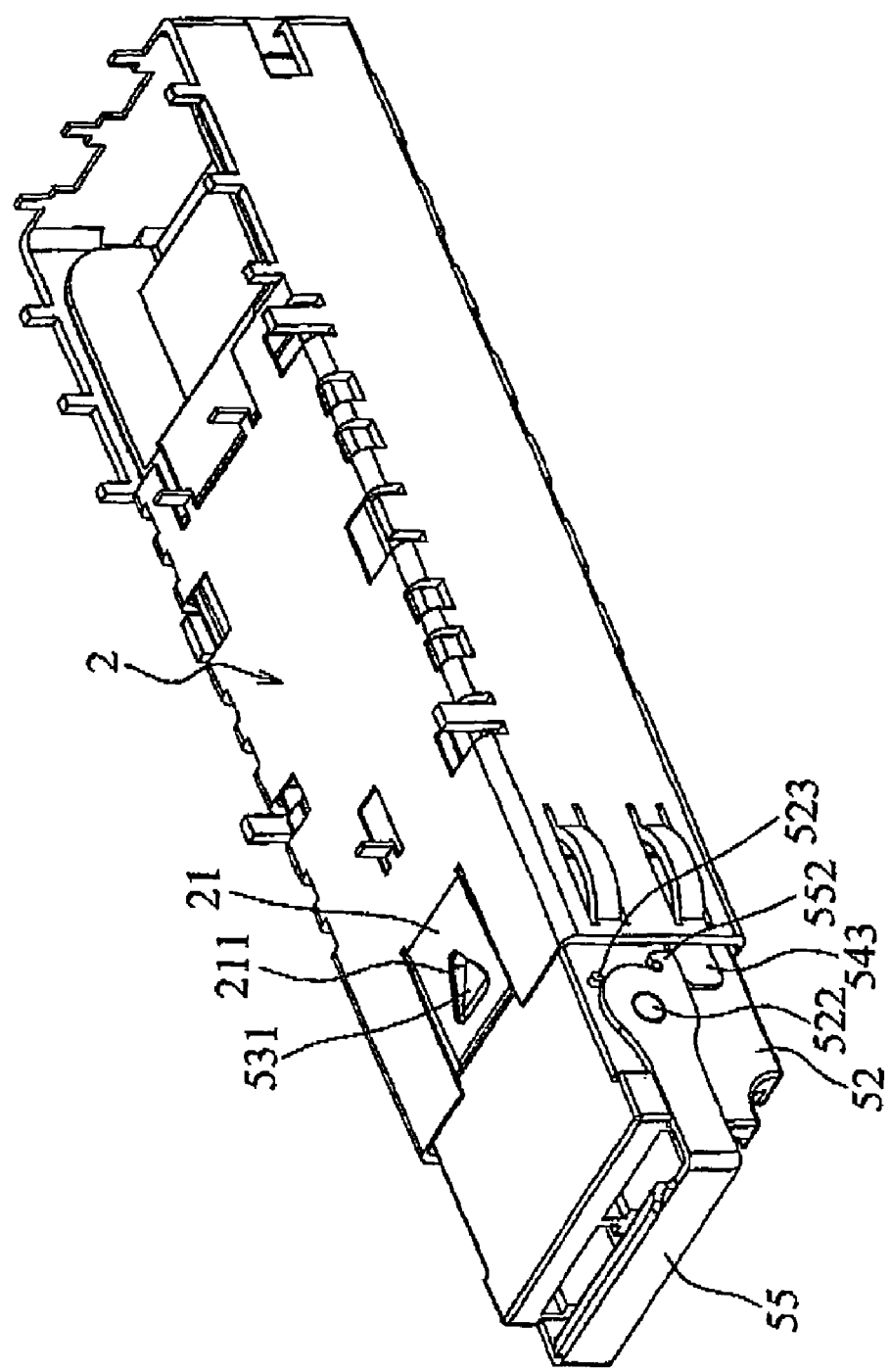
Figure 3F:
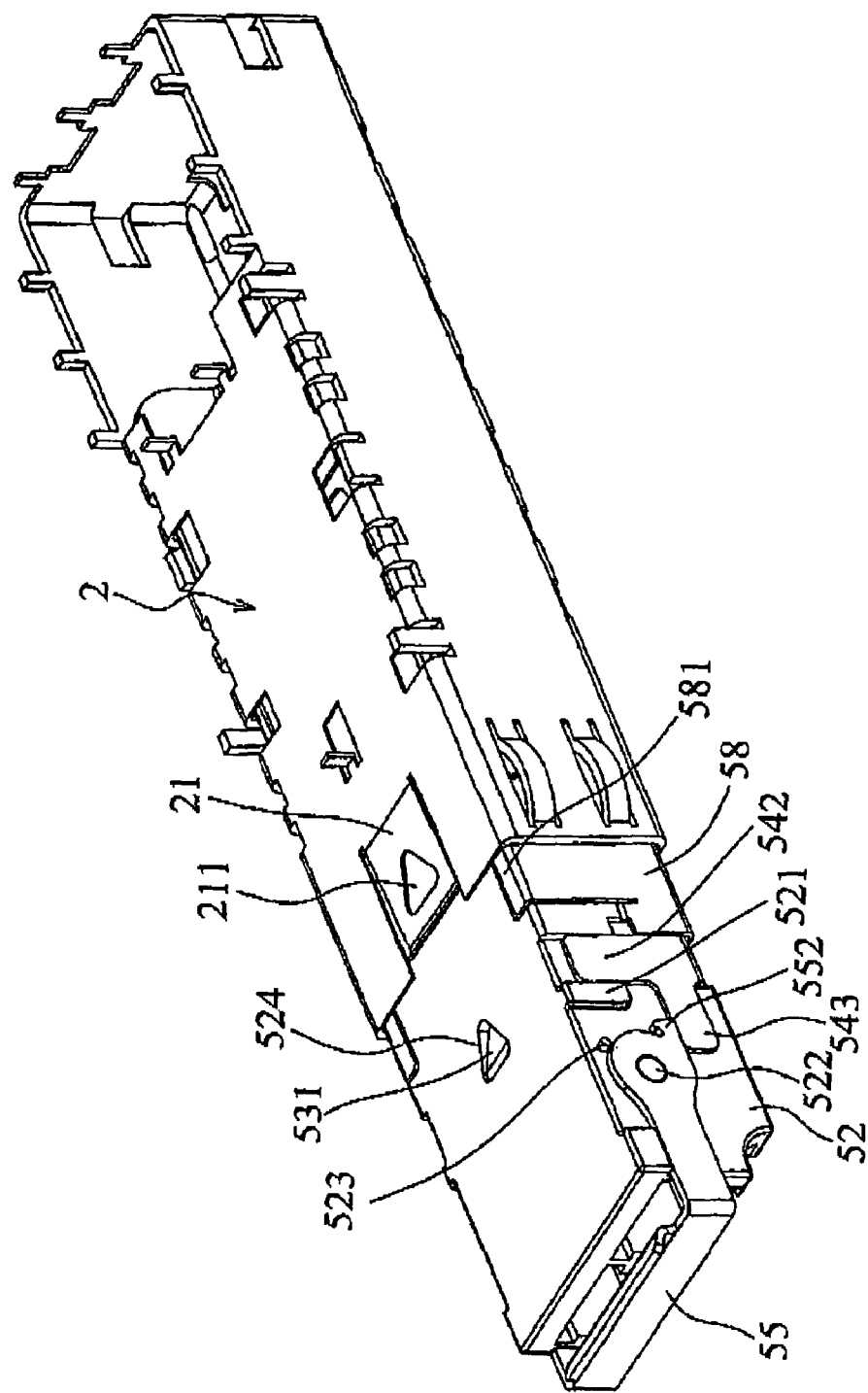
Figure 4A:
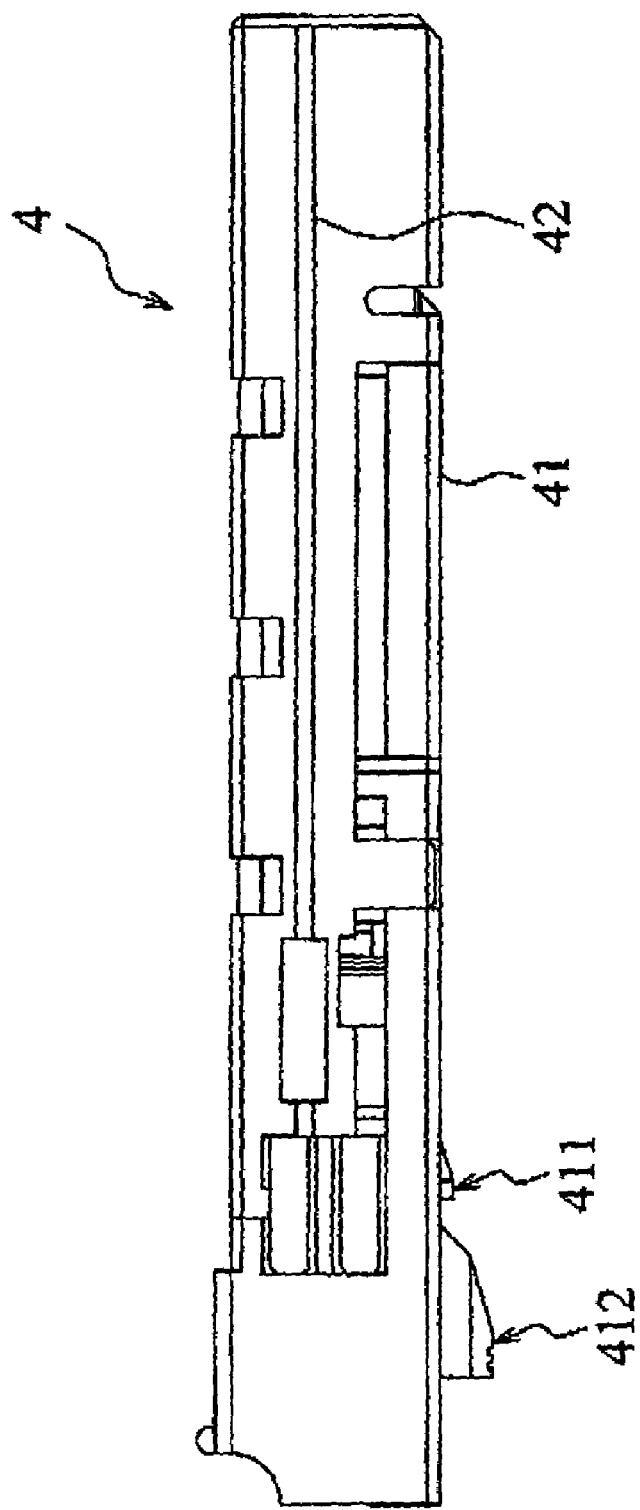
FIG. 4A is a plane view of a conventional optical transceiving module.
Figure 4B:
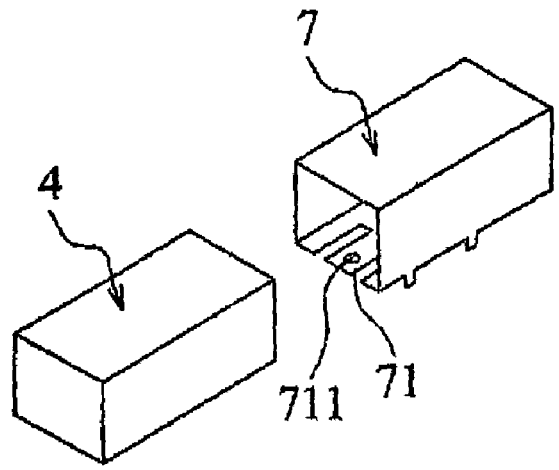
FIG. 4B is a schematic diagram illustrating the coupling relationship between a conventional optical transceiving module and a communication set.
Figure 4C:
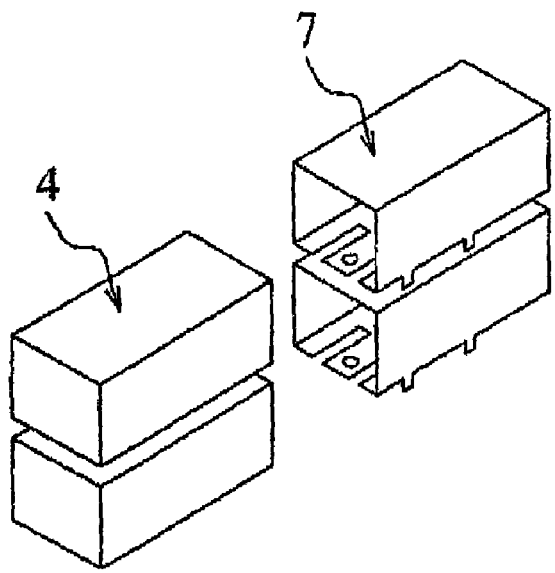
FIG. 4C is a schematic diagram illustrating the coupling relationship between a conventional optical transceiving module and a communication set in a vertically side-by-side arrangement.

The latch base 52 has a pair of guide pins 521, a pair of pivots 522, and a pair of catches 523 separately mounted on two sides, and a vertical through hole 524 is formed in the latch base 52. The latch 53 is composed of a protrusion 531 and a pin 532 and penetrates the latch base 52. The protrusion 531 is used to join with the fastening hole 211 of the fixed cover 21 on the communication set 2 as shown in FIG. 3D, while a pivot joint 533 is formed at the end of the pin 532 for joining with the fastener 57. The linking member 54 has a base 541, two sidewalls 542 that are protruded from the base 541 and perpendicular to the base 541, two sidewalls 543 extending from the two sidewalls 542 and are perpendicular to the base 541, and a through hole 544 formed on the base 541. The sidewalls 542 are movable along the guide pin 521, and the sidewalls 543 are coupled-to the pulling rod 55. The pulling rod 55 has two through holes 551 and two lugs 552 formed separately on the two sides.

The process of assembling the latch 53, the linking member 54, the pulling rod 55, the elastomer 56, and the fastener 57 on the latch base 52 is described below. First, place the linking member 54 on the latch base 52 where the sidewalls 543 are sitting on the guide pins 521 and the sidewalls 542 are positioned next to the guide pins 521 while the through hole 544 is aligned with the through hole 524. Second, insert the pivot joint 533 of the latch 53 into the elastomer 56, the through holes 524 and the through holes 544, sequentially, and fix the pivot joint 533 on the linking member 54 with the fastener 57. Third, join the through holes 551 on the two sides of the pulling rod 55 with the pivots 522 on the latch base 52, and make the lugs 552 contact against the catches 523 of the latch base 52. The protrusion 531 is emerged above the surface of the latch base 52 and the lugs 552 are partially in contact with the sidewalls 543 after the completion of assembly. In addition, the optical transceiving module 5 of this embodiment further has a protecting shell 58 with hooks 581 provided on two sides. The protecting shell 58 covers the linking member 54 or the module body 51, and the hooks 581 are hooked to the bottom of the module body 51.

Referring to FIGS. 3B to 3F, the pulling rod 55 rotates about the pivots 522 in this embodiment. The lugs 552 force the sidewalls 543 to move in a vertical direction, which causes the protrusion 531 to submerge under the latch base 52. According to this mechanism, the joint between the protrusion 531 and the fastening hole 211 of the fixed cover 21 on the communication set 2 can be disengaged through the rotate of the pulling rod 55. Thus, the inconvenience of releasing optical transceiving modules from a communication set in vertically side-by-side arrangement is solved.

In this embodiment, the elastomer 56 is pressed at the moment when the protrusion 531 is disengaging from the fastening hole 211, thus the protrusion 531 would return to its' position due to the elasticity thereafter. Therefore, the protrusion 531 will join smoothly with the fastening hole 211 when the optical transceiving module 5 is put in the communication set 2 in the next time. Moreover, although the illustrated protrusion 531 is in a triangular shape, the pins 532 are circular in a cross-sectional view, and the fastener 57 is a c-shaped retaining ring, the shape of the elements are not limited thereof. For example, the surface of the protrusion 531 can be slanted or not, in shapes such as polygon, circles, ellipses, any shape which corresponds to the shape of the fastening hole 211. The pivot joint 533 of the pin 532 which joins with the linking member 54 can be threaded while the fastener 57 be a nut.

In addition, the latch 53 and the linking member 54 can be located on the different side of the latch base 52 or the same side of the latch base 52.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A pulling structure for an optical transceiving module assembled with a housing, comprising:
   a latch base mounted on the optical transceiving module;
   a latch mounted in the latch base;
   a linking member coupled to the latch to enable the latch to move along a particular direction; and
   a pulling rod pivoting on two opposite surfaces of the latch base and having a pair of through holes, within which the linking member engages, wherein each through hole is larger than a diameter of the linking member to be such size that the pulling rod is rotated to the particular direction to pivotably drive the linking member to enable the latch to be fully disengaged from a fastening hole of the housing.

2. The pulling structure for the optical transceiving module as described in claim 1, further comprising a bump mounted on the latch base.

3. The pulling structure for the optical transceiving module as described in claim 1, wherein the linking member is a cross bar having an active plate extending from a center thereof and guiding the latch to move.

4. The pulling structure for the optical transceiving module as described in claim 3, wherein the cross bar has a terminal face with a shape of polygon, circle, or ellipse.

5. The pulling structure for the optical transceiving module as described in claim 3, wherein the active plate has a curved surface or a plane.

6. The pulling structure for the optical transceiving module as described in claim 1, wherein the linking member is a cross bar, and the latch base is further provided with another through hole for allowing the cross bar to penetrate therethrough.

7. The pulling structure for the optical transceiving module as described in claim 6, wherein the cross bar is connected to the pulling rod by a fastener.

8. The pulling structure for the optical transceiving module as described in claim 1, wherein the latch penetrates the latch base, and has a bump.

9. An optical transceiving module assembled with a housing, comprising:
   a module body;
   a latch base mounted on the module body;
   a latch in the latch base;
   a linking member coupled to the latch to enable the latch to move along a particular direction; and
   a pulling rod pivoting on two opposite surfaces of the latch base and having a pair of through holes, within which the linking member engages, wherein each through hole is larger than a diameter of the linking member to be such size that the pulling rod is rotated to the particular direction to pivotably drive the linking member to enable the latch to be fully disengaged from a fastening hole of the housing.

10. The optical transceiving module as described in claim 9, further comprising a bump mounted on the module body or the latch base.

11. The optical transceiving module as described in claim 9, wherein the linking member is a cross bar having an active plate extending from a center thereof and guiding the latch to move.

12. The optical transceiving module as described in claim 11, wherein the crossbar has a terminal face with a shape of polygon, circle, or ellipse.

13. The optical transceiving module as described in claim 11, wherein the active plate has a curved surface or a plane.

14. The optical transceiving module as described in claim 9, wherein:
   the housing covers the module body and comprising a cover; and
   the latch has a slanted terminal face for pushing up the cover.

15. The optical transceiving module as described in claim 9, wherein the linking member is a cross bar, and the latch base is further provided with another through hole for allowing the cross bar to penetrate therethrough.

16. The optical transceiving module as described in claim 15, wherein the cross bar is connected to the pulling rod by a fastener.

17. The optical transceiving module as described in claim 9, wherein the latch penetrates the latch base, and has a bump.

18. The optical transceiving module as described in claim 17, wherein the latch base comprises a guide pin; and the linking member comprises a base coupled the latch, at least one first sidewall protruding from the base, at least one second sidewall extending from the first sidewall; wherein the first sidewall is movable along the guide pin, and the second sidewall is coupled to the pulling rod.

19. The optical transceiving module as described in claim 17, further comprising an elastomer which encircles the latch.

20. The optical transceiving module as described in claim 9, further comprising a protecting shell covering the linking member or the module body.

21. The pulling structure for the optical transceiving module as described in claim 1, wherein the cross bar has a terminal face with a shape of polygon, circle, or ellipse.

22. The optical transceiving module as described in claim 9, wherein the cross bar has a terminal face with a shape of polygon, circle, or ellipse.

23. An optical transceiving module comprising:

a latch base mounted on the optical transceiving module;

a latch mounted in the latch base;

a linking member coupled to the latch to enable the latch to move along a particular direction; and a pulling rod having a pair of arms respectively pivotally connected on two opposite surfaces of the latch base, the pair of arms each having a through hole, within which the linking member engages, wherein the through hole is configured to be such size that the pulling rod is capable of being swiveled to pivotably drive the linking member to a status that the pair of arms is substantially in parallel with the particular direction.

24. The pulling structure for the optical transceiving module as described in claim 1, wherein the pulling rod is substantially rotated 90 degrees to the particular direction.

25. The optical transceiving module as described in claim 9, wherein the pulling rod is substantially rotated 90 degrees to the particular direction.

\* \* \* \* \*